(12) United States Patent
Lu et al.

(10) Patent No.: US 7,230,974 B1
(45) Date of Patent: Jun. 12, 2007

(54) METHODS AND APPARATUS FOR SYNCHRONIZING AND/OR DETERMINING THE LOCATION OF NODES

(75) Inventors: I-Tai Lu, Dix Hills, NY (US); Mario Joa-Ng, Iselin, NJ (US)

(73) Assignee: Polytechnic University, New York, NY (US)

( * ) Notice: Subject to any disclaimer, the term of this patent is extended or adjusted under 35 U.S.C. 154(b) by 0 days.

(21) Appl. No.: 09/573,766

(22) Filed: May 18, 2000

Related U.S. Application Data (60) Provisional application No. 60/134,694, filed on May 18, 1999.

(51) Int. Cl.
*H04B 1/00* (2006.01)

(52) U.S. Cl. ...................................................... 375/145

(58) Field of Classification Search ................. 375/356, 375/145, 354, 358, 365, 366, 367, 375, 368, 375/149, 147, 141, 140, 130, 362; 709/400; 455/265, 257, 255, 230, 130; 370/507, 503, 370/498, 464; 340/681, 673, 540, 500, 678; 398/154, 140; 702/89, 85; 713/400
See application file for complete search history.

(56) References Cited

U.S. PATENT DOCUMENTS

| | | | | |
|---|---|---|---|---|
| 4,392,220 A | * | 7/1983 | Hirosaki et al. | 370/479 |
| 4,866,704 A | * | 9/1989 | Bergman | 370/452 |
| 5,375,141 A | * | 12/1994 | Takahashi | 375/149 |
| 5,488,631 A | * | 1/1996 | Gold et al. | 375/145 |
| 5,668,803 A | * | 9/1997 | Tymes et al. | 370/312 |
| 5,775,996 A | * | 7/1998 | Othmer et al. | 463/40 |
| 6,042,477 A | * | 3/2000 | Addink | 463/42 |
| 6,256,337 B1 | * | 7/2001 | Hendrickson et al. | 375/140 |
| 6,456,672 B1 | * | 9/2002 | Uchiki et al. | 375/344 |
| 6,532,243 B1 | * | 3/2003 | Leijonhufvud | 370/503 |
| 6,714,563 B1 | * | 3/2004 | Kushi | 370/503 |

* cited by examiner

*Primary Examiner*—Pankaj Kumar
(74) *Attorney, Agent, or Firm*—Straub and Pokotylo; John C. Pokotylo

(57) ABSTRACT

Synchronizing the clocks of nodes or stations in a communications network in a way that is independent of computation and switching time. This may be done by synchronizing pseudo-random noise clocks (found in the nodes of a spread spectrum communication system) or by synchronizing chip sequence clocks (found in the nodes of a CDMA communication system). In this way, the accuracy of synchronization should only be affected by the resolution of a matched filter (i.e., a facility to match or correlate bit sequences) in the node. Once synchronized, these nodes may be used to locate another node or station based on transmission propagation delays determined by the synchronization method.

19 Claims, 10 Drawing Sheets

METHODS AND APPARATUS FOR SYNCHRONIZING AND/OR DETERMINING THE LOCATION OF NODES

§ 1. RELATED APPLICATION(S)

Benefit is claimed, under 35 U.S.C. § 119(e)(1), to the filing date of provisional patent application Ser. No. 60/134,694, entitled "SPREAD SPECTRUM BASED SYNCHRONIZATION AND LOCATION DETERMINATION METHOD FOR WIRELESS SYSTEMS", filed on May 18, 1999 and listing I-Tai Lu and Mario Joa-Ng as inventors, for any inventions disclosed in the manner provided by 35 U.S.C. § 112, ¶1. This provisional application is expressly incorporated herein by reference.

§ 2. BACKGROUND

§ 2.1 Field of the Invention

The present invention concerns synchronizing nodes in any environment. The present invention also concerns locating nodes in a wireless environment.

§ 2.2 Related Art

Although the node synchronization aspect of the present invention can be applied to nodes in any environment, the node location determination aspect of the present invention is particularly useful in a wireless environment. In particular, the node location determination aspect of the present invention may be applied in a wireless environment which employs spread spectrum modulation. The code division multiple access (or "CDMA") scheme may be used in this environment. Although spread spectrum modulation is well understood by those skilled in the art, it is introduced in § 2.2.1 below for the reader's convenience. Similarly, although code division multiple access (or "CDMA") is well understood by those skilled in the art, it is introduced in § 2.2.2 below for the reader's convenience.

§ 2.2.1 Spread Spectrum Modulation

Spread spectrum modulation modulates an already modulated signal a second time, in such a way as to generate a waveform which almost unnoticeably coexists with other signals in the same frequency band. Thus, the spread spectrum signal and other signals in the same frequency band may be said to be "transparent" to one another. More specifically, given an already modulated waveform, the spread spectrum technique further modulates this waveform so as to produce a very wideband signal.

The spread spectrum technique has been used in the military since it is difficult to detect and jam. More specifically, since the spread spectrum modulation decreases the transmit power spectral density so that it lies well below a thermal noise level, it is difficult to detect. Further, since it is difficult for a jamming signal to have sufficient power at all frequencies, a spread spectrum modulated signal is difficult to jam. In addition to historically military applications, spread spectrum modulation is now found in many commercial applications.

There are two (2) basic types of spread spectrum modulation—direct sequence (or "DS") and frequency hopping (or "FH"). Since direct sequence spread spectrum modulation is the most applicable, it is introduced below for the reader's convenience.

A direct sequence spread spectrum signal is one in which the amplitude of an already modulated signal is amplitude modulated by a very high rate binary stream of digits. This very high rate binary stream of digits may be referred to as a pseudo-random noise (or "PN") binary sequence having the values of ±1. The PN binary sequence is generated in a deterministic manner and is repetitive. Since the bit rate of the PN binary sequence is typically much greater than that of the modulated (e.g., data) waveform, it is often said that the PN binary sequence "chops" the bits of data into "chips". Accordingly, the rate of the PN binary sequence may be referred to as the "chip rate". When the PN binary sequence is used to modulate the already modulated waveform, the frequency spectrum of the already modulated waveform is spread out. More specifically, the spectrum is spread by the ratio of the frequency of the PN binary sequence to the frequency of the original signal. Similarly, power spectral density of the resulting signal is reduced by the ratio of the frequency of the original signal to the frequency of the PN binary sequence.

Figure 1A:
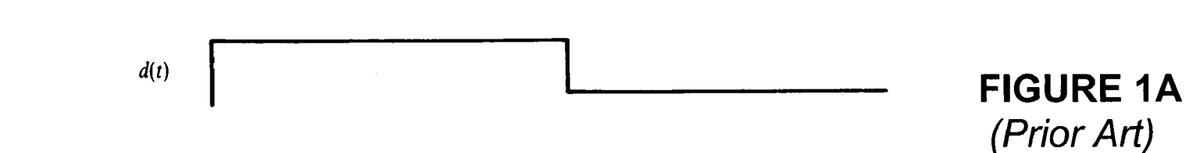
FIG. 1A illustrates a datastream waveform.
Figure 1B:
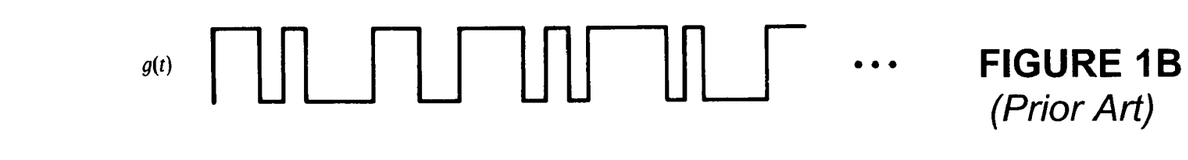
FIG. 1B illustrates a chipping waveform.
Figure 1C:
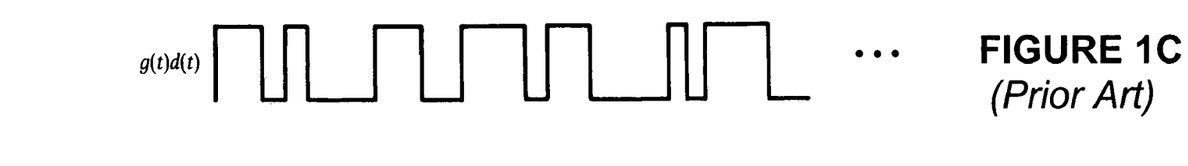
FIG. 1C illustrates the waveform resulting from combining the datastream waveform of FIG. 1A and the chipping waveform of FIG. 1B.
Figure 2:
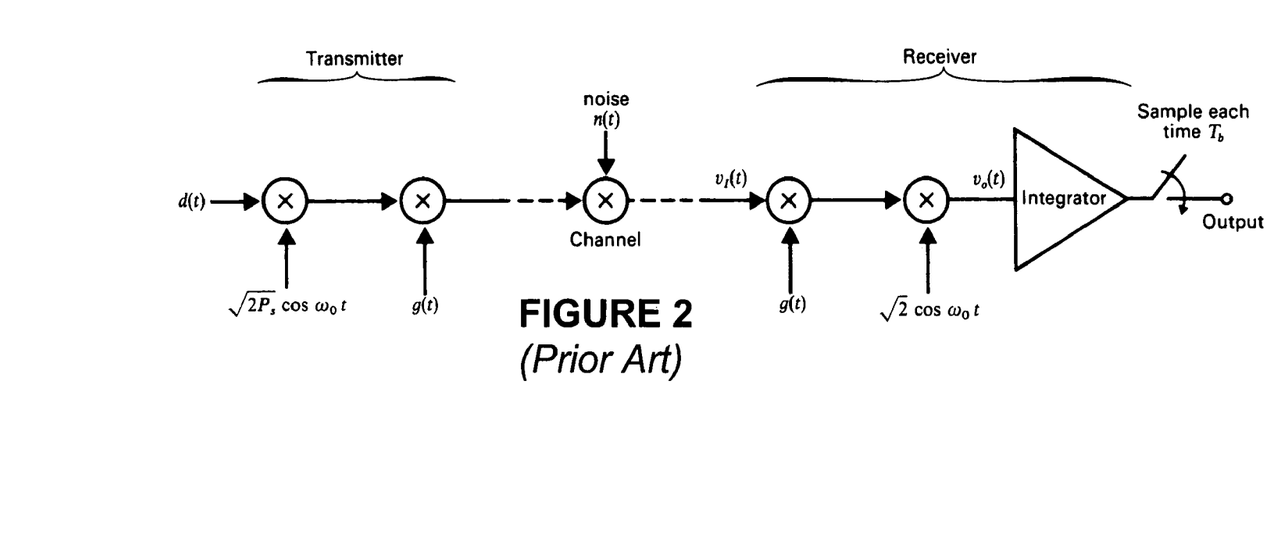
FIG. 2 is a schematic diagram of an exemplary binary phase shift key communications system which incorporates the spread spectrum technique.

FIGS. 1A through 1C illustrate an original signal waveform, a PN binary sequence, and their product, respectively. FIG. 2 is a high level block diagram which illustrates a binary phase shift key (or "BPSK") communication system incorporating a spread spectrum technique.

Having introduced the technique of spread spectrum modulation, code division multiple access (or "CDMA") is now introduced in § 2.2.2 below.

§ 2.2.2 Code Division Multiple Access

Code division multiple access (or "CDMA") allows each station or node of a network to transmit over the entire frequency spectrum at any time. Multiple simultaneous transmissions are separated using coding theory. As was the case with spread spectrum, in CDMA, each bit time is subdivided into a number "m" of short intervals commonly referred to as "chips". Typically, there are 64 or 128 chips per bit. To increase the amount of information to be sent from "b" bits per second to m×b chips per second, the available bandwidth is increased by a factor of m. Thus, CDMA may be thought of as a form of spread spectrum communications.

Each station is assigned a unique m-bit code commonly referred to as a "chip sequence". To transmit a "1" bit, a station sends its chip sequence. To transmit a "0" bit, a station sends the one's complement of its chip sequence. No other patterns are permitted. Thus, for example, if m=8 and a station is assigned 10010001 as its chip sequence, it can transmit a 1 bit by sending 10010001 and it can transmit a 0 bit by sending 01101110.

Using the symbol s to denote the m-chip vector for a station and $\overline{S}$ as it negation, the manner in which communications are divided by the chip sequence (hence the term "code division") is explained. All chip sequences are pairwise orthogonal, which means that the normalized inner product of any two (2) distinct chip sequences is 0. This property may be expressed as follows:

$$S^{node\ a} \cdot S^{node\ b} \equiv \frac{1}{m}\sum_{i=1}^{m} S_i^{node\ a} S_i^{node\ b} = 0$$

That is, as many pairs of the chip pattern of each station or node are the same as are different. This property of the chip sequences of the stations permits a station to recover data sent by another station, even when such data is transmitted in the presence of other transmissions.

In an ideal, noiseless CDMA system, the number of stations or nodes could be made arbitrarily large by using longer chip sequences. In practice, physical limitations reduce this capacity. For example, not all of the chips will be synchronized in time. In practice, the sender and receiver stations or nodes synchronize by having the sender transmit a long enough known chip sequence (also referred to as a "training sequence") that the receiver can lock onto.

In view of the foregoing, it is clear that spread spectrum communications use a pseudo-noise code (PN) to "chop" bits of data into chips. Similarly, in CDMA, stations or nodes use a chip sequence to subdivide bits into chips.

§ 2.2.3 Simple Method for Synchronizing the Clocks of Two Nodes

Although the following method is presented in the background of the invention section, its inclusion here should not be construed as an admission that it is prior art to the present invention.

Figure 3:
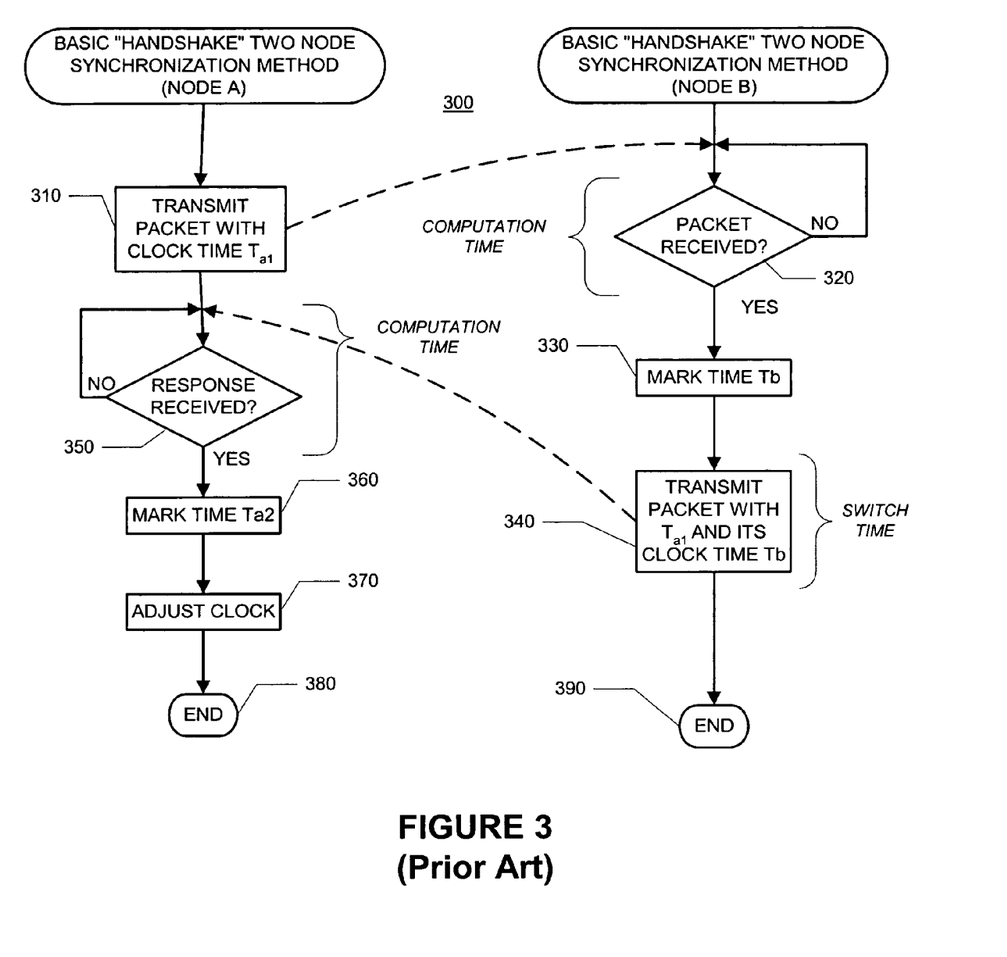
FIG. 3 is a flow diagram of a basic handshake method which may be used to synchronize two nodes.

FIG. 3 is a flow diagram of a simple method for synchronizing the clocks of two (2) nodes, referred to below as "node A" and "node B". As shown in block 310, node A transmits to node B (or, alternatively, broadcasts), a packet with its clock time ($T_{a1}$), as depicted by the dashed line. At node B, after the packet transmitted from node A is received, it is marked with time $T_b$ as shown in decision block 320 and block 330. Notice that these steps may have an associated computation time. Basically, $T_b$ will $T_{a1}$ plus the propagation delay time (k) for the transmission of the packet from node A to node B. Here, it is assumed that the computation time is negligible. Then, a packet with the times $T_{a1}$ and $T_b$ is formed and sent from node B back to node A as shown in block 340 and depicted by the dashed line. The switch in operation of node B from a receive mode to a transmit mode may have an associated switch time. At this point, the method is done in node B as shown by END node 390.

Figure 4:
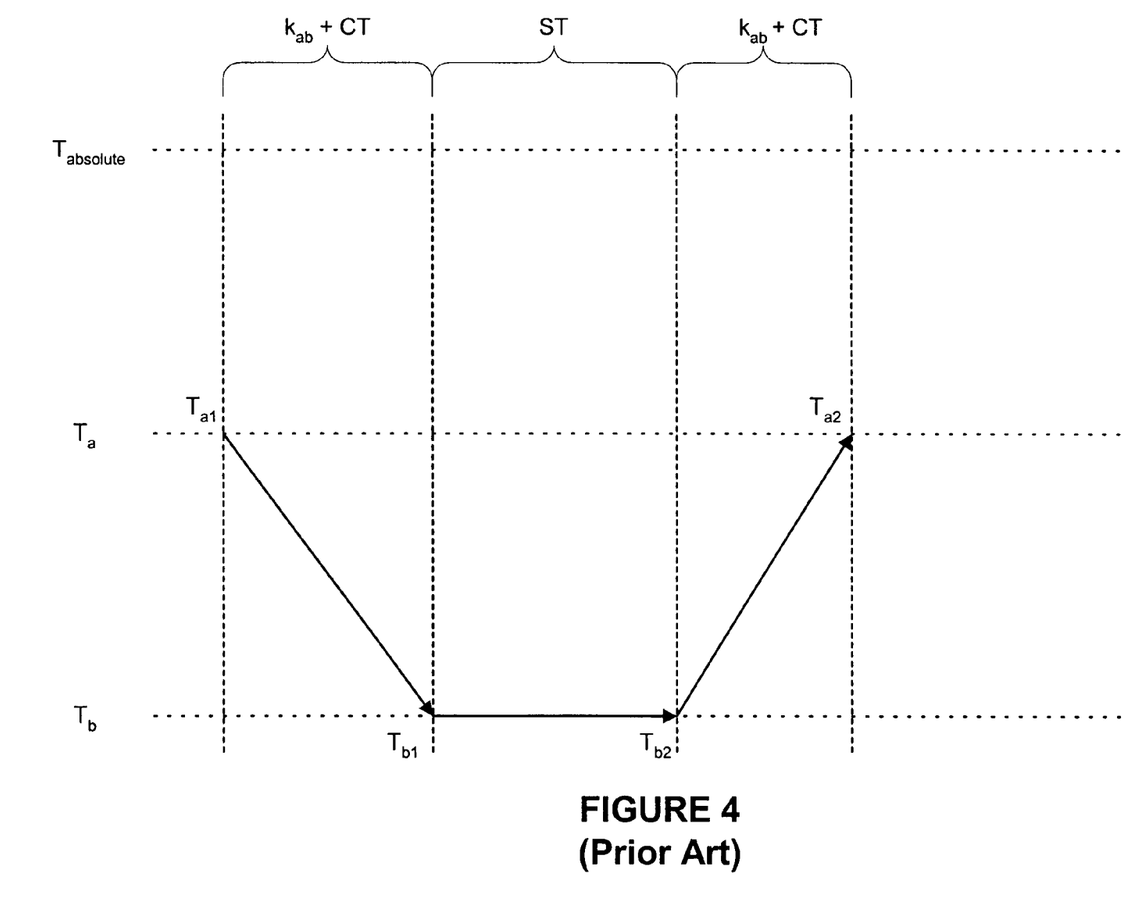
FIG. 4 illustrates the operation of the method of FIG. 3.

When node A receives the packet from node B, it marks a time $T_{a2}$ as shown by decision block 350 and block 360. Node A may then adjust its clock by adding $$T_b - \frac{T_{a2} + T_{a1}}{2}$$

to its time, thereby synchronizing its clock with the clock of node B. This can be seen from FIG. 4 which illustrates the operation of the method of FIG. 3. Since node A and B are not (necessarily) synchronized, without loss of generality, assume that the clock of node B is ahead of that of node A by s. More specifically, notice that $T_{b1}=T_{a1}+k+s$ (+computation time which is deemed negligible). $T_{b2}=T_{b1}$ (+switching time which is deemed negligible). Thus, $T_{b2}=T_{a1}+k+s$ (+computation time+switching time, each of which is deemed negligible). The time $T_{a2}=T_{b2}+k-s=T_{a1}+k+k$ (+computation time+switching time, each of which is deemed negligible)=$T_{a1}+2k$ (+computation time+switching time, each of which is deemed negligible). The propagation delay is therefore simply $$\frac{T_{a2} - T_{a1}}{2}$$

(assuming that the computation and switch times are negligible). The clock at node A should be updated to the clock at node B plus the propagation delay. That is $T_{a2}$ should be set to $$T_{b2} + k = T_{b2} + \frac{T_{a2} - T_{a1}}{2}.$$

Since the foregoing relationship can be expressed as $$T_{a2} + T_b - \frac{T_{a2} + T_{a1}}{2},$$

node A can update its clock merely by incrementing it by $$T_b - \frac{T_{a2} + T_{a1}}{2}$$

as described above.

As can be appreciated from its description, the clock synchronization method of claim 3 assumes that the computation time and switching time are negligible and can be ignored. This is not always the case. Therefore, a better clock synchronization method is needed. Such a synchronization method should be independent of computation and switching times.

§ 3. SUMMARY OF THE INVENTION

In one aspect of the present invention, a method for synchronizing two (2) nodes (each node including a transmitter, a receiver and a sequence for chipping data to be transmitted) is described. The method may include acts of (a) transmitting, with a first node, its sequence for chipping data, (b) upon receiving, with a second node, the first node's sequence for chipping data, synchronizing a clock in the second node based on the sequence for chipping data, (c) transmitting, with the second node, its sequence for chipping data based on the clock, (d) upon receiving, with the first node, the second node's sequence, determining an offset based on the received sequence, and (e) adjusting a clock of the first node based on the received second node's sequence. The act of adjusting a clock of the first node based on the received sequence may be effected by setting the clock of the first node back by one-half of the offset.

Another aspect of the present invention teaches a method for synchronizing three (3) nodes. The method includes acts of (a) transmitting, with a first node, the sequence for chipping data, (b) upon receiving, with a second node, the sequence for chipping data, synchronizing a clock in the second node based on the sequence for chipping data, (c) upon receiving, with a third node, the sequence for chipping data, synchronizing a clock in the third node based on the sequence for chipping data, (d) transmitting, with the second node, the sequence for chipping data based on the clock in the second node, (e) transmitting, with the third node, the sequence for chipping data based on the clock in the third node, (f) upon receiving, with the first node, the sequence of the second node, determining a first offset based on the received sequence of the second node, (g) upon receiving, with the first node, the sequence of the third node, determining a second offset based on the received sequence of the third node, (h) transmitting, with the first node, the first and second offsets, (i) upon receiving the first offset by the second node, adjusting a clock of the second node based on the received first offset, and (j) upon receiving the second offset by the third node, adjusting the clock of the third node based on the received second offset. This method may further (k) determine a third offset by the third node upon receiving the first offset, (l) transmitting, with the third node, the third offset, and (m) determining, with the first node, a propagation delay between the second and third nodes based on the third offset.

In any of the methods of the present invention, the sequence may be a repeated chip pattern and the nodes may employ code division multiple access communications. Alternatively, in any of the method of the present invention, the sequence may be a pseudo noise code and the nodes may employ spread spectrum communications.

In any of the methods of the present invention, the offset(s) may be independent of a time for synchronizing a clock in the second node based on the sequence for chipping data. Further, in any of the methods of the present invention, the offset(s) may be independent of a time for switching the second node from a reception mode to a transmission mode.

The first offset may correspond to a transmission propagation delay between the first and second nodes, the second offset may correspond to a transmission propagation delay between the first and third nodes, and the third offset may correspond to a transmission propagation delay between the second and third nodes.

The method may further determine a location of a fourth node, relative to the first, second and third nodes, based on the first, second and third offsets. This location may be determined by (i) simultaneously broadcasting, by the first, second and third nodes, the first, second and third offsets, respectively, (ii) determining, with the fourth node, a chip offset between its clock and a chip pattern in each of the broadcasts from the first, second and third nodes, (iii) determining, with the fourth node, offsets between the first and second nodes and between the first and third nodes based on the respective chip offsets, (iv) determining, with the fourth node, two half-hyperbola curves based on the chip offsets and the offsets between the first and second nodes and the first and third nodes, (v) determining, with the fourth node, a point of intersection of the two half-hyperbola curves, (vi) determining, with the fourth node, propagation delays between the fourth node and each of the first, second and third nodes based on the point of intersection, and (vii) determining, with the fourth node, distances between the fourth node and each of the first, second and third node based on the respective propagation delays determined.

Another aspect of the present invention describes a node which may be used to effect the described methods. Such a node may include (a) a transmitter, (b) a receiver, (c) a controller for controlling the transmitter and receiver, (d) a chip pattern for spreading the frequency spectrum of data to be transmitted by the transmitter, (e) a matched filter for determining a chip pattern which has been used to spread the frequency spectrum of a received signal, (f) a clock for controlling the demodulation of a received signal, and (g) a synchronization facility for synchronizing the clock of the node based on an attribute of the chip pattern determined by the matched filter.

§ 5. DETAILED DESCRIPTION

The present invention involves novel methods, apparatus and data structures for synchronizing the clocks of stations or nodes, which may be further used to locate a station or node. The following description is presented to enable one skilled in the art to make and use the invention, and is provided in the context of particular embodiments and methods. Various modifications to the disclosed embodiments and methods will be apparent to those skilled in the art, and the general principles set forth below may be applied to other embodiments, methods and applications. Thus, the present invention is not intended to be limited to the embodiments and methods shown and the inventors regard their invention as the following disclosed methods, apparatus and materials and any other patentable subject matter to the extent that they are patentable.

Functions which may be performed by the present invention are introduced in § 5.1 below. Then, exemplary structures, processes, methods and data structures which may be used to effect the functions of the present invention, as well as examples of how various methods operate, are described in § 5.2. Finally, some conclusions about the present invention are set forth in § 5.3 below.

§ 5.1 FUNCTIONS OF THE PRESENT INVENTION

The present invention may function to synchronize the clocks of nodes or stations in a communications network. The present invention may do so in a way that is independent of computation and switching time. More specifically, the present invention may do so by synchronizing pseudo random noise clocks (found in the nodes of a spread spectrum communication system) or by synchronizing chip sequence clocks (found in the nodes of a CDMA communication system). In this way, the accuracy of the present invention should only be affected by the resolution of a matched filter (i.e., means to match or correlate bit sequences) in the node. Further, the present invention may function to locate a node or station. The present invention may do so based on transmission propagation delays determined by the synchronization method.

§ 5.2 EXEMPLARY PROCESSES, STRUCTURES AND METHODS

Exemplary nodes or stations with which the present invention may be used are described in § 5.2.1 below with reference to FIGS. 11 and 12. Then, an exemplary method for synchronizing two (2) nodes or stations in accordance with the present invention is described in § 5.2.2 below with reference to FIGS. 5 and 6. Thereafter, an exemplary method for synchronizing three (3) or more nodes or stations in accordance with the present invention is described in § 5.2.3 below with reference to FIGS. 7, 8 and 9. Finally, an exemplary method for locating a node or station in accordance with the present invention is described in § 5.2.4 below with reference to FIGS. 7 through 10.

§ 5.2.1 Exemplary Nodes or Stations

Two (2) exemplary nodes or stations, which may be used to effect at least some aspects of the present invention, are now described with reference to FIGS. 11 and 12.

Figure 11:
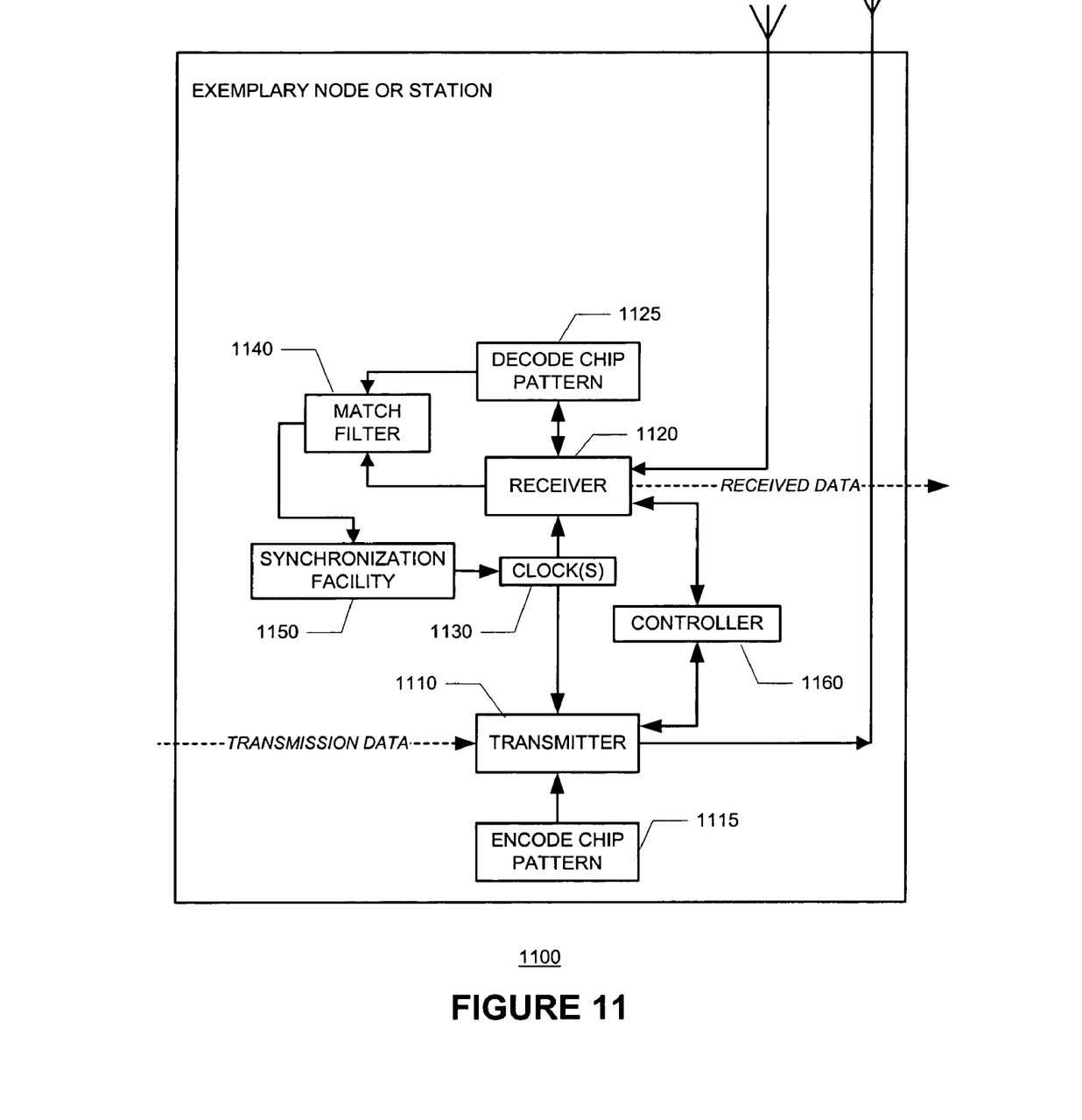
FIG. 11 is a high level block diagram of an exemplary node or station which may be used to effect at least some aspects of the present invention.

FIG. 11 is a high level block diagram of an exemplary node or station 1100 which may be used to effect at least some aspects of the present invention. The exemplary node or station 1100 may include a transmitter portion 1110 and a receiver portion 1120. The transmitter portion 1110 may transmit applied "transmission data", after chipping it based on an encode chip pattern 1115 and modulating it. The transmitter may use the clock(s) 1130 and may operate under the control of a controller 1160. The receiver portion 1120 may determine "received data" from data taken from an antenna, demodulated, and decoded based on a decode chip pattern 1125. A matched filter 1140 may use the demodulated data and the decode chip pattern 1125 to provide a chip clock signal to a synchronization facility 1150. The synchronization facility 1150 may be used to effect various aspects of the present invention (e.g., to synchronize a clock(s) 1130 with that of the node or station transmitting the data) as described below.

One or more of the blocks depicted in FIG. 11 may be implemented in hardware, such as an application specific integrated circuit (or "ASIC"), a digital signal processor (or "DSP"), or an oscillator, or in software stored in memory and effected on one or more processors. A control and/or data bus may also be provided.

Figure 12:
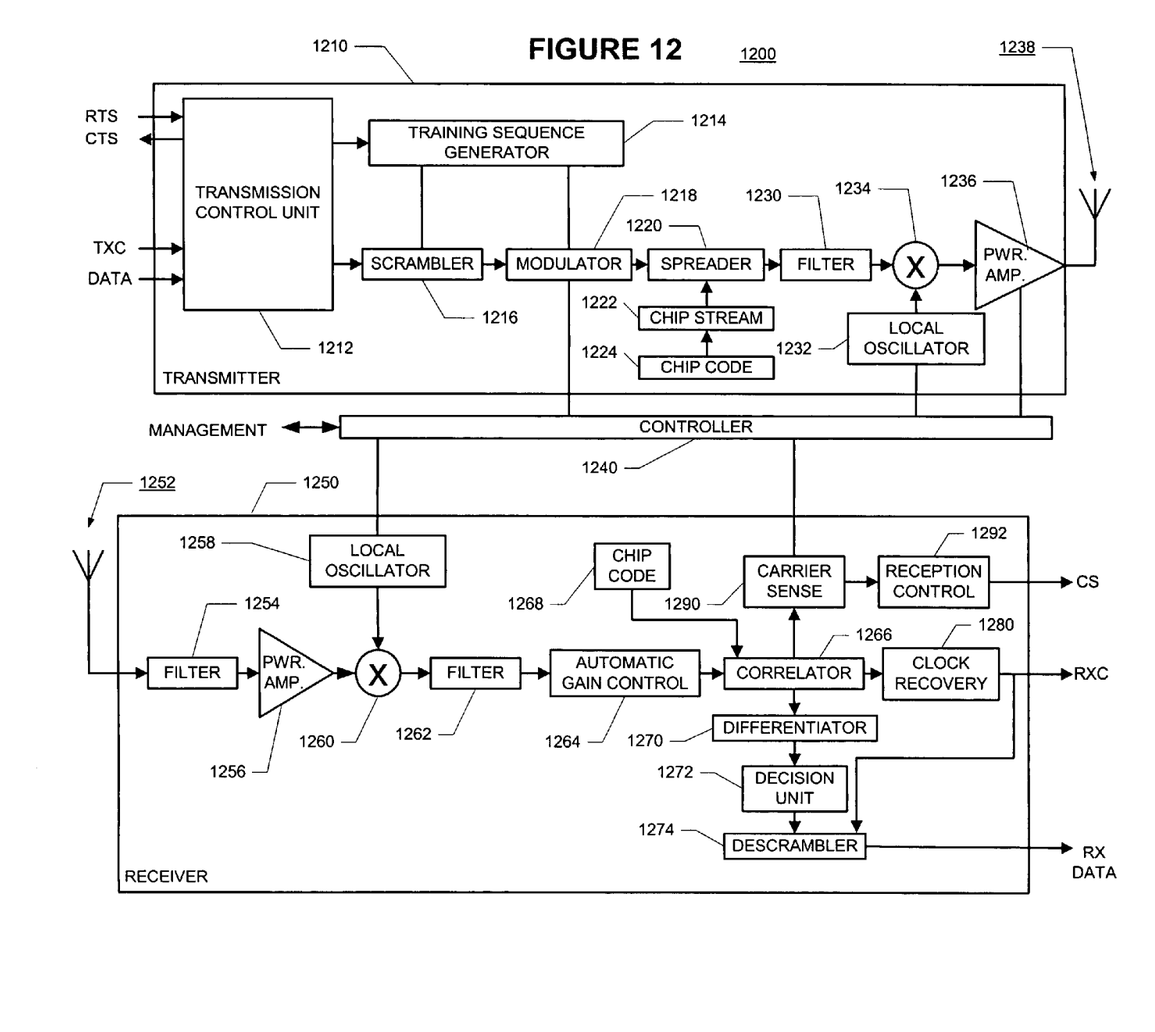
FIG. 12 is a block diagram of another exemplary node or station which may be used to effect at least some aspects of the present invention.

FIG. 12 is a block diagram of another exemplary node or station 1200 which may be used to effect at least some aspects of the present invention. Basically, the node or station 1200 may include a transmitter 1210 coupled with a transmission antenna 1238, a receiver 1250 coupled with a reception antenna 1252, and a controller 1240. Each is now described.

Although not particularly relevant to the present invention, the transmitter may account for the possibility of hidden nodes using "request to send" (or "RTS") and "clear to send" (or "CTS") packets using a transmission control unit 1212. As shown, the transmission control unit 1212 may also accept data to be transmitted and a transmission clock ("TXC"). The data to be transmitted may be scrambled by the scrambler 1216 to avoid runs of errors (When a problem occurs on a channel, it may affect a series of adjacent bits. Such a series of bits will not be in a row when the bits are descrambled.). The scrambled data may the be modulated by modulator 1218 (e.g., a DQPSK modulator). Next, as discussed above, the modulated signal is spread by spreader 1220 which applies a chip stream 1222 which is a repeated chip code 1224 at a relatively high clock rate. The resulting spread signal may then be filtered by the filter 1230, mixed with a signal from a local oscillator 1232 by a mixer 1234, amplified by power amplifier 1236, and applied to a transmission antenna 1238. A training sequence provided by the training sequence generator 1214 may be used by a receiver to achieve and maintain chip clock synchronization. Various components of the transmitter may be controlled in a centralized manner by controller 1240.

Turning now to the receiver 1250 of the node or station 1200, a signal received by the antenna 1252 may be filtered by the filter 1254 and amplified by the power amplifier 1256. The amplified signal may then be mixed with a signal from a local oscillator 1258 by a mixer 1260. The resulting signal may be filtered by a filter 1262 and applied to an automatic gain control facility 1264 which may be used to remove amplitude variations in the received signal. Next, a correlator 1266 may use the same chip code 1268 as was used by the transmitter of the node transmitting the received signal to de-spread the signal. The chip code should be synchronized with that of the transmitter (Recall the training sequence generator 1214.). The chip sequence is assigned and agreed upon during the configuration. The resulting signal may be applied to the carrier sense 1290 and reception control 1292 facilities to determine carrier sense ("CS"). The clock ("RXC") may also be recovered from the de-spread signal using a clock recovery facility 1280. The de-spread signal may also be applied to a differentiator 1270 to extract the data from the differential data received. This extracted data may then be applied to a four-level decision unit 1272 (assuming that QPSK modulation was used). The resulting data may then be descrambled using the descrambler 1274, operated under the recovered clock ("RXC"), to recover the original data (e.g., bit stream).

One or more of the blocks depicted in FIG. 12 may be implemented in hardware, such as an application specific integrated circuit (or "ASIC"), a digital signal processor (or "DSP"), or an oscillator, or in software stored in memory and effected on one or more processors. A data bus and/or a control bus may also be provided.

Having described exemplary nodes or stations which may be used to effect at least some aspects of the present invention, exemplary synchronization and location methods are described in §§ 5.2.2 through 5.2.4 below.

§ 5.2.2 Exemplary Method for Synchronizing Two Nodes or Stations

Figure 5:
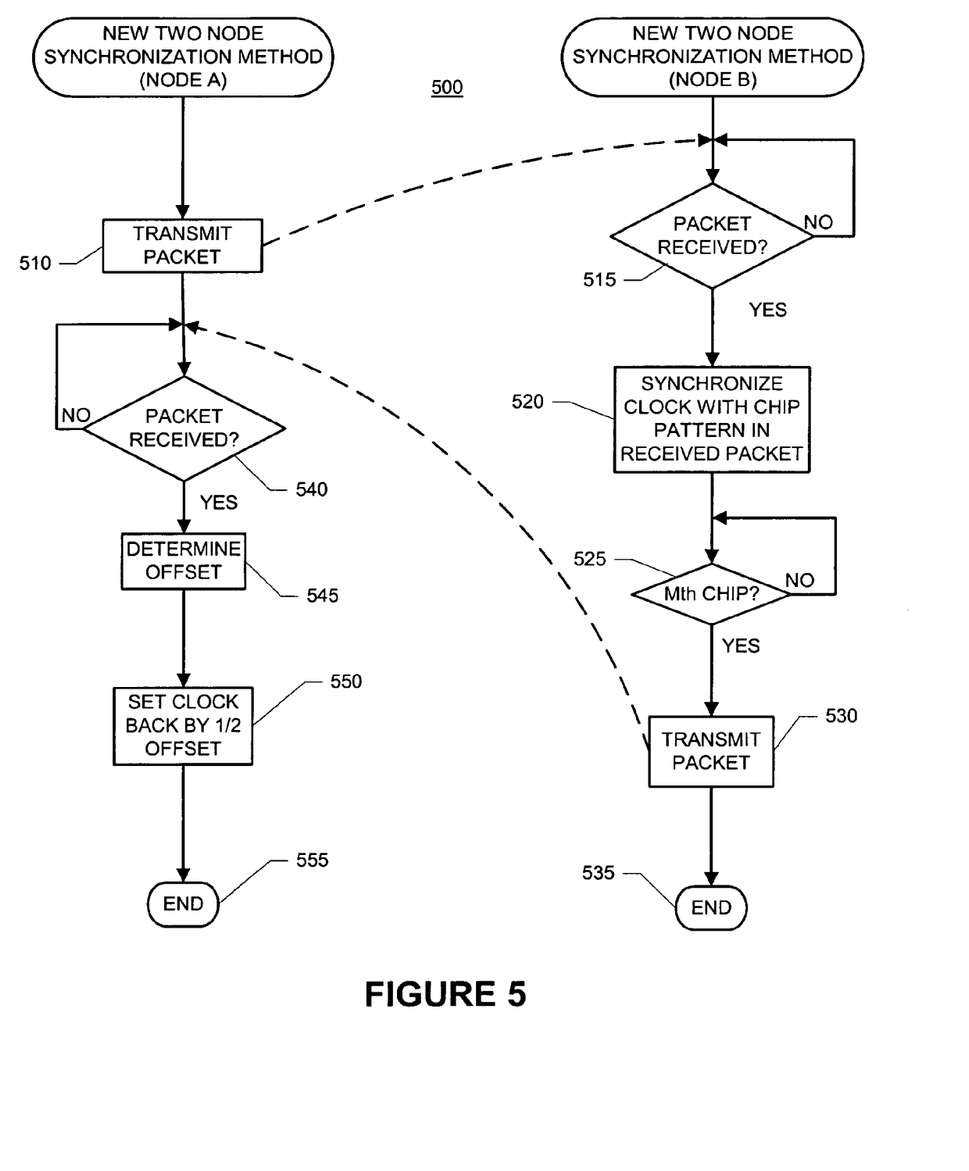
FIG. 5 is a flow diagram of an exemplary two (2) node synchronization method of the present invention which exploits chip sequences or pseudo random sequences.
Figure 6:
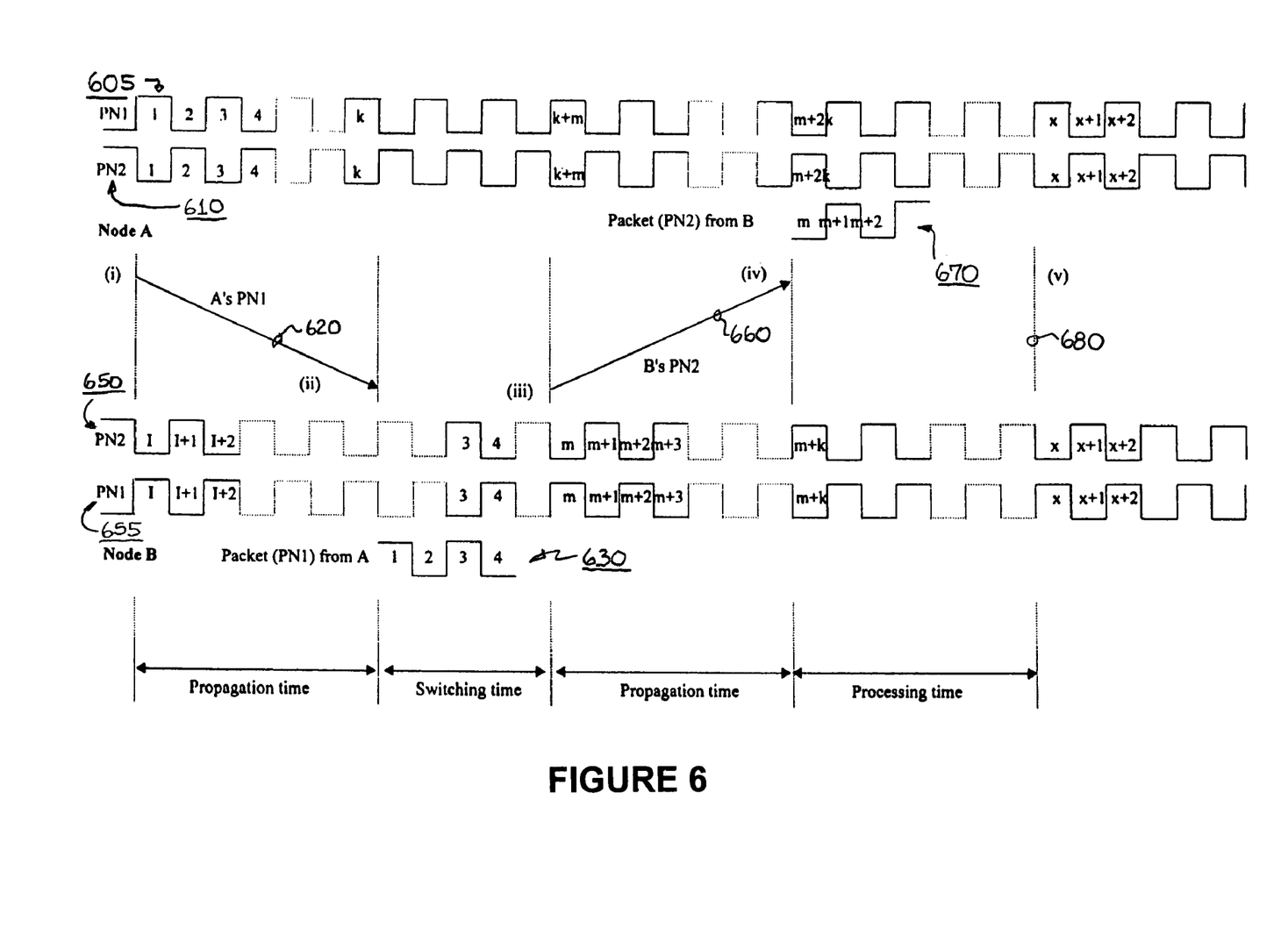
FIG. 6 illustrates the operation of the method of FIG. 5.

FIG. 5 is a high level flow diagram of an exemplary method 500 which may be used to synchronize two (2) nodes or stations, referred to as node A and node B. FIG. 6 illustrates an example of how this method 500 may operate.

As shown in block 510, node A transmits a packet. The packet includes the chip pattern (or, alternatively, pseudo-noise code) of node A. (See, e.g., 605 of FIG. 6.) The chip pattern may be a repeated pattern with a very long period. After some propagation time, the packet will arrive at node B. (See, e.g., 620 of FIG. 6.) As shown in decision block 515 and block 520, upon receiving the packet, node B synchronizes its clock with the chip pattern in the received packet. (See, e.g., 650 and 630 of FIG. 6.) Node B may perform such synchronization, for example, by shifting the chip pattern 650 until the chip pattern 650 matches with the chip pattern in the received packet 630. Its clock as well as the chip pattern 655 may be shifted simultaneously. Further, after a number (e.g., m) of chips, node B transmits a packet as shown in decision block 525 and block 530. This occurs during the "switching time". The packet includes the chip pattern (or, alternatively, pseudo-noise code) of node B. The chip pattern may be a repeated pattern with a very long period. Thus, at this point, node B's chip pattern will lag that of node A by the propagation time. Node B is then done with the synchronization process 500 as indicated by END node 535.

After some propagation time, the packet transmitted from node B will arrive at node A. (See, e.g., 660 of FIG. 6.) As shown in decision block 540 and 545, when node A receives the packet, it determines an offset between its chip pattern and the chip pattern of the received packet. (See, e.g., 605 and 670.) Node A may determine the offset by shifting the chip pattern 605 until the chip pattern 605 matches with the chip pattern in the received packet 670. Its clock, as well as the chip pattern, 670 may be shifted simultaneously. This offset should correspond to both propagation delays. If both propagation delays can be assumed to be the same, the offset will be twice the propagation delay. Node A then synchronizes its clock with that of node B by setting its clock back by one half of the determined offset value. (See, e.g., 680 of FIG. 6.) That is, recall that when node B synchronized its clock with that of the packet from node A, its clock lagged that of node A by the propagation delay. By setting its clock back by half of the total delay (i.e., by setting its clock back by the propagation delay), node A is now synchronized with node B. Node A is then done with the synchronization process 500 as indicated by END node 555. Referring to FIG. 6, notice that at the end of the processing time 680, the chip sequences (or pseudo-noise codes) of nodes A and B are synchronized.

§ 5.2.3 Exemplary Method for Synchronizing Three Nodes or Stations

Figure 7:
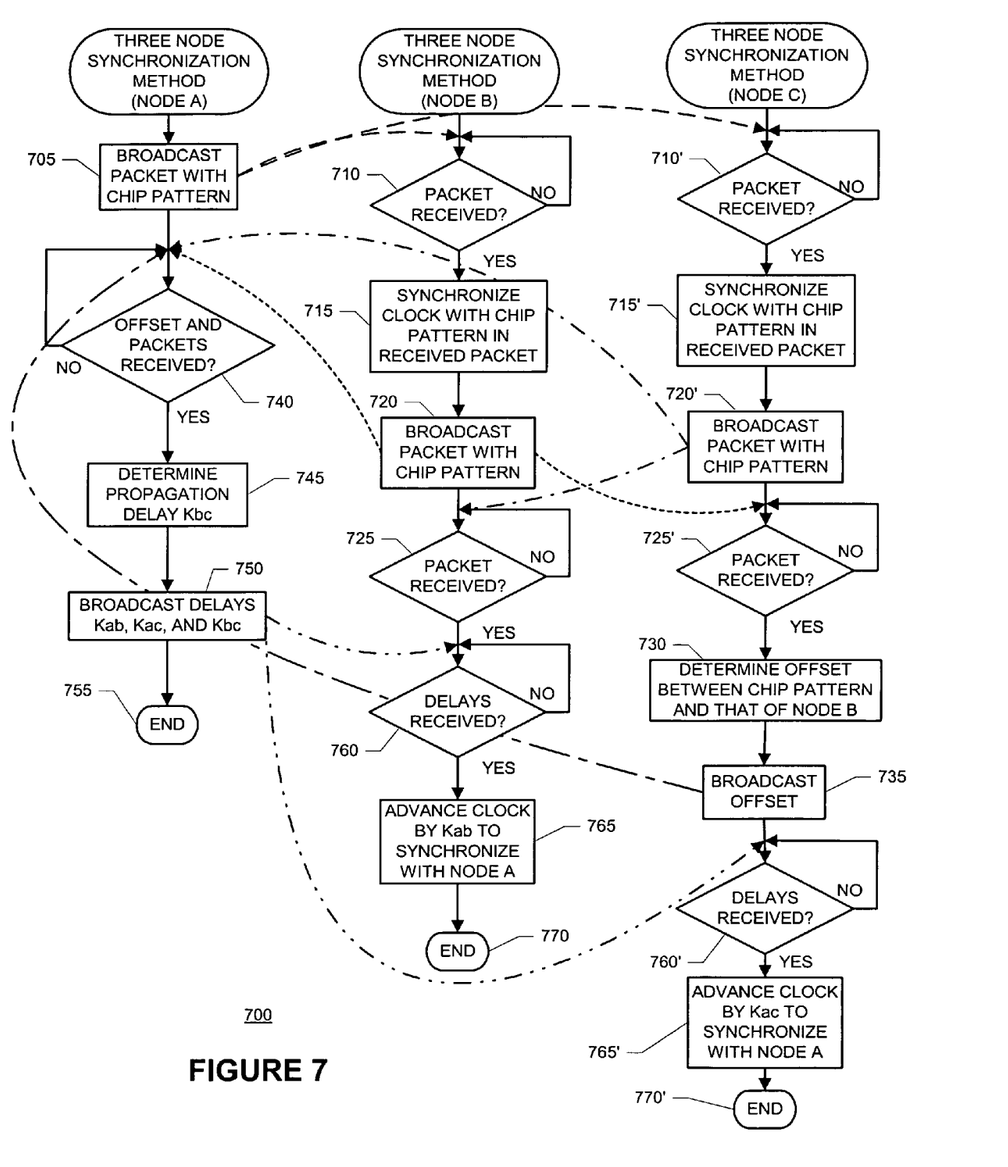
FIG. 7 is a flow diagram of an exemplary three (3) node synchronization (and location) method of the present invention which exploits chip sequences or pseudo random sequences.
Figure 8:
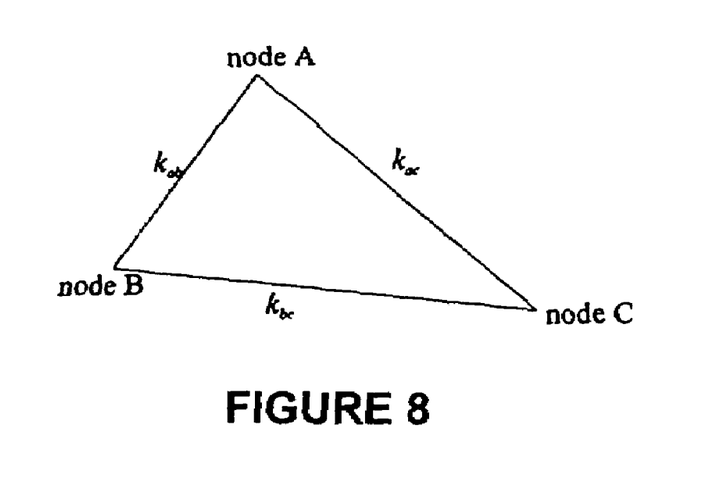
FIG. 8 illustrates propagation delays between the three nodes which may be synchronized in accordance with the method of FIG. 7.
Figure 9:
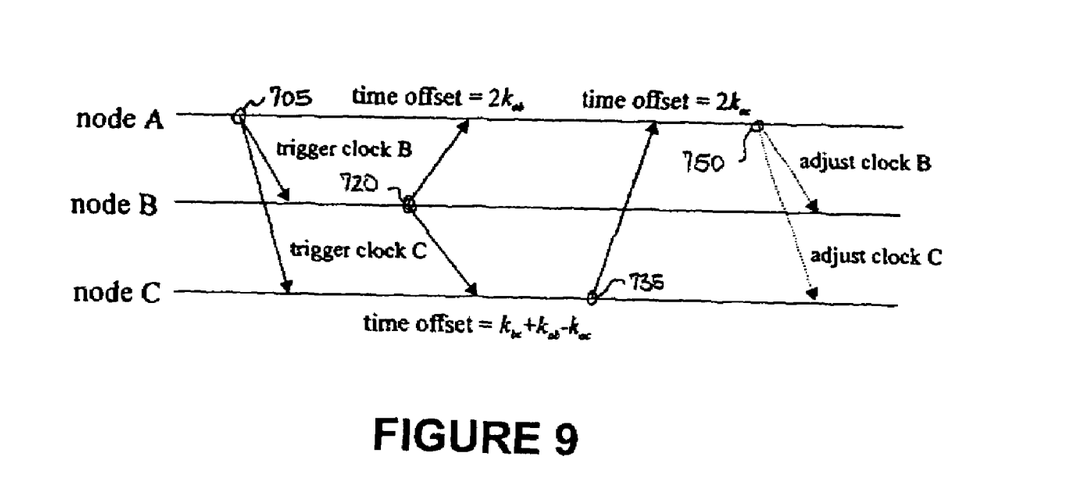
FIG. 9 illustrates the operation of the method of FIG. 7.

FIG. 7 is a high level flow diagram of an exemplary method 700 which may be used to synchronize three (3) nodes or stations, referred to as node A, node B and node C. FIG. 8 is an example of an arrangement of nodes A, B and C, as well as propagation delays between the nodes. FIG. 9 illustrates an example of the operation of this method 700.

Referring to FIG. 7, as shown in block 705, node A broadcasts a packet. This is denoted as 705 in FIG. 9. As was the case with the method 500 discussed above with reference to FIG. 5, the packet includes a chip pattern (or pseudo random sequence). The chip pattern may be a repeated pattern with a very long period. As shown in blocks 710 and 715, and 710' and 715', when nodes B and C receive the packet, each synchronizes its clock with the chip pattern in the received packet. Nodes B and C may perform such clock synchronization by shifting their chip patterns until their chip patterns match the chip pattern in the received packet. Their clocks may be shifted simultaneously. Thus, at this point, the clock of node A is ahead of that of node B by a propagation delay $k_{ab}$ and is ahead of that of node C by a propagation delay $k_{ac}$. Nodes B and C then each broadcast a packet with their chip pattern (or pseudo random sequence) as shown in blocks 720 (also shown in FIG. 9) and 720', respectively. The chip pattern may be a repeated pattern with a very long period. Alternatively, only one of the nodes (e.g., node B) makes such a broadcast.

When node B receives the packet from node C, its processing continues as shown in decision block 725. When node C receives the packet from node B, it determines an offset $S_{bc}$ between its chip pattern and that of node B as shown in decision blocks 725' and 730. (Since the propagation delay between nodes B and C is $k_{bc}$ and the clock of node C is ahead of that of node B by $(k_a-k_{ac})$, the offset $S_{bc}$ may be expressed as $k_{bC}+k_{ab}-k_{ac}$. Node C then broadcasts the offset $S_{bc}$ as shown in block 735. This is also shown in FIG. 9. As shown in decision block 740 and block 745, when node A receives the offset $S_{bc}$ (from node C) and the packets (from nodes B and C), it determines the propagation delays $k_{ab}$, $k_{ac}$ and $k_{bc}$. These delays may be derived by comparing its chip pattern (clock) to those in the received packets, as well as from the offset broadcast by node C. Once these delays are determined by node A, they are broadcast as shown in block 750. This is also shown in FIG. 9. At this point, node A is done as indicated by the END node 755.

As shown in decision block 760 and block 765, when node B receives the delays (actually, it need only receive the delay $k_{ab}$), it advances its clock by the delay $k_{ab}$ to synchronize its clock with that of node A. At this point, node B is done as indicated by the END node 770. Similarly, as shown in decision block 760' and block 765', when node C receives the delays (actually, it need only receive the delay $k_{ac}$), it advances its clock by the delay $k_{ac}$ to synchronize its clock with that of node A. At this point, node C is done as indicated by the END node 770'.

Notice that the delay $k_{bc}$ is not needed for synchronization. Thus, strictly speaking, blocks 730 and 735 are not needed for synchronization. However, the delay $k_{bc}$ is useful for locating a node as will become apparent in the description in § 5.2.4 below.

The distances between nodes A and B ($d_{ab}$), between nodes A and C ($d_{ac}$) and between nodes B and C ($d_{bc}$) can also be determined by multiplying their respective propagation delays by a transmission speed (e.g., the speed of light).

§ 5.2.4 Exemplary Method for Locating a Node or Station

Figure 10:
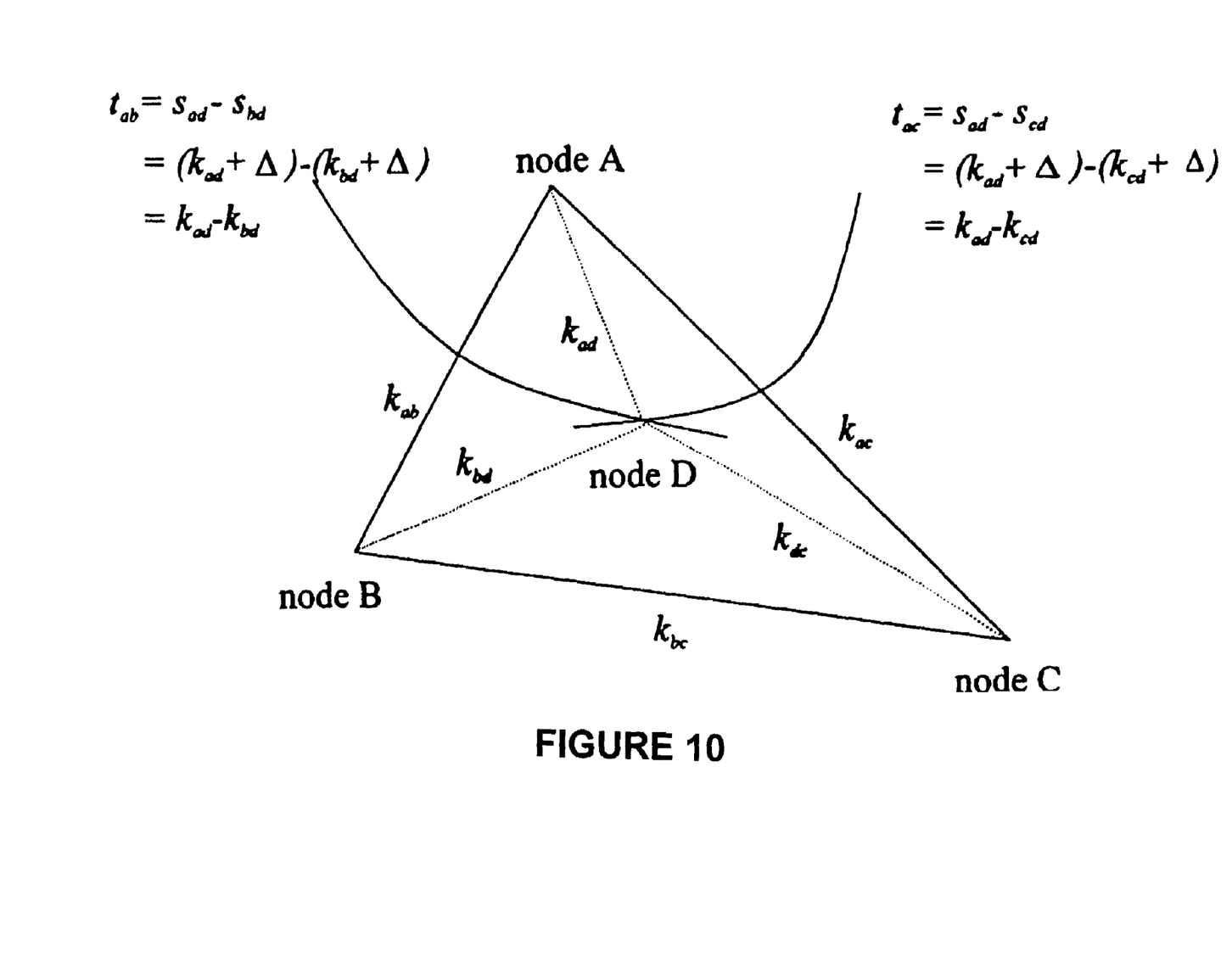
FIG. 10 illustrates a way in which the method of FIG. 7 may be used for locating a node.

FIG. 10 illustrates a manner in which three (3) synchronized nodes can be used to determine the location of a fourth node. First, the three (3) synchronized nodes simultaneously broadcast (Since the nodes are synchronized, they could agree to broadcast at the same instant.) their relative location (i.e., propagation delay $k_{ab}$, $k_{ac}$, $k_{bc}$) information. Node D determines the chip offsets $s_{ad}$, $s_{bd}$ and $s_{cd}$ between its clock and the chip patterns in the packets from nodes A, B and C. As shown, the chip offset $s_{ad}=k_{ad}+\Delta$, the chip offset $s_{bd}=k_{bd}+\Delta$ and the chip offset $S_{cd}=k_{cd}+\Delta$, where $\Delta$ is the difference between the clock of node D and those of the synchronized nodes.

From the chip offsets, node D can determine the offset $t_{ab}$ between the chip patterns in the packets received from node A and node B ($t_{ab}=s_{ad}-s_{bd}$), as well as the offset $t_{ac}$ between the chip patterns in the packets from node A and node C ($t_{ac}=s_{ad}-s_{cd}$). Together with the received location information $k_{ab}$, $k_{ac}$ and $k_{bc}$, two (2) half-hyperbola curves can be drawn using the offsets $t_{ab}$ and $t_{ac}$ as shown in FIG. 10. Node D can determine the propagation delays $k_{ad}$, $k_{bd}$ and $k_{cd}$ from the point of intersection. Thus, it can determine its location (relative to nodes A, B and C) by multiplying the delays with the transmission speed (e.g., the speed of light). Moreover, it can determine its clock difference $\Delta$ by subtracting any propagation delay from its associated chip offset. Node D can use this clock offset $\Delta$ to synchronize its clock with those of nodes A, B and C.

As can be appreciated from the foregoing, further nodes can use this method, independently, to determine their location and to achieve global synchronization.

§ 5.3 CONCLUSIONS

In view of the foregoing, the present invention provides synchronization methods which may be used in spread spectrum or CDMA communications systems. This method may be used in wireless networks for example. The synchronization methods are more cost-effective than GPS-based methods which need a synchronized satellite network. Since an offset in a pseudo-noise code (or chip pattern) is used to measure the roundtrip transmission propagation time between nodes, any computation delay of processing handshaking messages and any switching delay in changing from a reception mode to a transmission mode do not affect its accuracy. Rather, the accuracy of the synchronization methods depend on the resolution of the matched filter (or correlator).

The location method is based on a commonly used triangulation technique. Three (3) nodes are selected and synchronized. Then, these synchronized nodes send pilot signals containing their locations (or transmission propagation delays) simultaneously. Other unsynchronized nodes may then detect time offsets between chip patterns in the received signals. From these time offsets and the locations of the synchronized nodes, the unsynchronized nodes can determine their locations (relative to the synchronized nodes) and can synchronize themselves with the synchronized nodes.

What is claimed is:

1. A method for synchronizing two nodes, each node including a transmitter, a receiver and a sequence for chipping data to be transmitted, the method comprising:
   a) transmitting, with a first one of the nodes, its sequence for chipping data;
   b) upon receiving, with a second one of the nodes, the first node's sequence for chipping data, synchronizing a clock in the second one of the nodes based on the sequence for chipping data;
   c) transmitting, with the second one of the nodes, its sequence for chipping data based on the clock;
   d) upon receiving, with the first one of the nodes, the second node's sequence, determining an offset based on the received sequence used by the second one of the nodes for chipping data; and
   e) adjusting a clock of the first one of the nodes based on the received sequence used by the second one of the nodes for chipping data,
      wherein the act of adjusting a clock of the first one of the nodes based on the received sequence used by the second one of the nodes for chipping data is effected by setting the clock of the first one of the nodes back by one-half of the offset determined in act (d).

2. A method for synchronizing two nodes, each node including a transmitter, a receiver and a sequence for chipping data to be transmitted, the method comprising:
   a) transmitting, with a first one of the nodes, its sequence for chipping data;
   b) upon receiving, with a second one of the nodes, the first node's sequence for chipping data, synchronizing a clock in the second one of the nodes based on the sequence for chipping data;
   c) transmitting, with the second one of the nodes, its sequence for chipping data based on the clock;
   d) upon receiving, with the first one of the nodes, the second node's sequence, determining an offset based on the received sequence used by the second one of the nodes for chipping data; and
   e) adjusting a clock of the first one of the nodes based on the received sequence used by the second one of the nodes for chipping data,
      wherein the offset is independent of a time for switching the second one of the nodes from a reception mode to a transmission mode.

3. The method of claim 2 wherein each of the sequences is a repeated chip pattern.

4. The method of claim 3 wherein the nodes employ code division multiple access communications.

5. The method of claim 2 wherein the sequence is a pseudo noise code.

6. The method of claim 5 wherein the nodes employ spread spectrum communications.

7. The method of claim 2 wherein the offset is independent of a time for synchronizing a clock in the second one of the nodes based on the sequence used by the first of the nodes for chipping data.

8. A method for synchronizing three nodes, each node including a transmitter, a receiver and a sequence for chipping data to be transmitted, the method comprising:
   a) transmitting, with a first one of the nodes, the sequence for chipping data;
   b) upon receiving, with a second one of the nodes, the sequence for chipping data, synchronizing a clock in the second one of the nodes based on the sequence for chipping data;
   c) upon receiving, with a third one of the nodes, the sequence for chipping data, synchronizing a clock in the third one of the nodes based on the sequence for chipping data;
   d) transmitting, with the second one of the nodes, the sequence for chipping data based on the clock in the second one of the nodes;
   e) transmitting, with the third one of the nodes, the sequence for chipping data based on the clock in the third one of the nodes;
   f) upon receiving, with the first one of the nodes, the sequence of the second one of the nodes, determining a first offset based on the received sequence of the second one of the nodes;
   g) upon receiving, with the first one of the nodes, the sequence of the third one of the nodes, determining a second offset based on the received sequence of the third one of the nodes;
   h) transmitting, with the first one of the nodes, the first and second offsets;
   i) upon receiving the first offset by the second one of the nodes, adjusting a clock of the second one of the nodes based on the received first offset; and
   j) upon receiving the second offset by the third one of the nodes, adjusting the clock of the third one of the nodes based on the received second offset.

9. The method of claim 8 further comprising:
   k) upon receiving, by the third one of the nodes, the first offset, determining a third offset;
   l) transmitting, with the third one of the nodes, the third offset;
   m) determining, with the first one of the nodes, a propagation delay between the second and third ones of the nodes based on the third offset.

10. The method of claim 8 wherein the sequence is a repeated chip pattern.

11. The method of claim 10 wherein the nodes employ code division multiple access communications.

12. The method of claim 8 wherein the sequence is a pseudo noise code.

13. The method of claim 12 wherein the nodes employ spread spectrum communications.

14. The method of claim 8 wherein the offset is independent of a time for synchronizing a clock in the second one of the nodes based on the sequence for chipping data.

15. The method of claim 8 wherein the offset is independent of a time for switching the second one of the nodes from a reception mode to a transmission mode.

16. The method of claim 8 wherein the first offset corresponds to a transmission propagation delay between the first and second ones of the nodes.

17. The method of claim 8 wherein the second offset corresponds to a transmission propagation delay between the first and third ones of the nodes.

18. The method of claim 9 wherein the first offset corresponds to a transmission propagation delay between the first and second ones of the nodes,
    wherein the second offset corresponds to a transmission propagation delay between the first and third ones of the nodes,
    wherein the third offset corresponds to a transmission propagation delay between the second and third ones of the nodes, the method further comprising:
    o) determining a location of a fourth node, relative to the first, second and third ones of the nodes based on the first, second and third offsets.

19. The method of claim 18 wherein the act determining a location of a fourth node includes:
    i) simultaneously broadcasting, by the first, second and third nodes, the first, second and third offsets, respectively;
    ii) determining, with the fourth node, a chip offset between its clock and a chip pattern in each of the broadcasts from the first, second and third nodes;
    iii) determining, with the fourth node, offsets between the first and second nodes and between the first and third nodes based on the respective chip offsets;
    iv) determining, with the fourth node, two half-hyperbola curves based on the chip offsets and the offsets between the first and second nodes and the first and third nodes;
    v) determining, with the fourth node, a point of intersection of the two half-hyperbola curves;
    vi) determining, with the fourth node, propagation delays between the fourth node and each of the first, second and third nodes based on the point of intersection; and
    vii) determining, with the fourth node, distances between the fourth node and each of the first, second and third node based on the respective propagation delays determined.

* * * * *